US006516410B1

United States Patent
Heller

(10) Patent No.: US 6,516,410 B1
(45) Date of Patent: Feb. 4, 2003

(54) METHOD AND APPARATUS FOR MANIPULATION OF MMX REGISTERS FOR USE DURING COMPUTER BOOT-UP PROCEDURES

(75) Inventor: Ed Heller, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/507,117

(22) Filed: Feb. 17, 2000

(51) Int. Cl.⁷ .............................................. G06F 9/445
(52) U.S. Cl. ...................................................... 713/2
(58) Field of Search ......................... 713/1, 2; 711/1–6; 712/200, 202

(56) References Cited

U.S. PATENT DOCUMENTS 5,109,329 A * 4/1992 Strelioff ...................... 710/261
6,009,509 A * 12/1999 Leung et al. ................ 712/202
6,075,940 A * 6/2000 Gosling ....................... 717/126

OTHER PUBLICATIONS

Programmer's Reference Manual, Intel Architecture MMX™ Technology, Chapters 2–5, Intel Corp., printed Sep. 26, 1996.

* cited by examiner

Primary Examiner—Thomas M. Heckler
(74) Attorney, Agent, or Firm—Akin Gump Strauss Hauer & Feld LLP

(57) ABSTRACT

A system for execution of code during power-on-self test (POST), the system including a mass storage device for storing computer programs; a microprocessor connected to the mass storage device, the microprocessor including an execution unit; a general purpose register connected to the execution unit, the general purpose register for storing a first data element; an MMX unit including a plurality of MMX registers, the MMX unit connected to the general purpose register, wherein the plurality of MMX registers are configurable as a virtual stack; a storage device connected to the microprocessor, the storage device for storing BIOS instructions; and a plurality of BIOS instructions stored on the storage device, the plurality of BIOS instructions readable by the microprocessor to thereby cause the microprocessor to execute a virtual stack push instruction wherein the first data element is moved from the general purpose register to a first of the plurality of MMX registers; and execute a virtual stack pop instruction wherein the first data element previously moved from the general purpose register to the first of the plurality of MMX registers is moved from the first of the plurality of MMX registers to the general purpose register; wherein the virtual stack push instruction and the virtual stack pop instruction are executable prior to initialization of a main memory.

21 Claims, 2 Drawing Sheets

METHOD AND APPARATUS FOR MANIPULATION OF MMX REGISTERS FOR USE DURING COMPUTER BOOT-UP PROCEDURES

BACKGROUND OF THE INVENTION

1. Field of the Invention

The present invention relates generally to microprocessor design and, in particular, but not by way of limitation, to memory use procedures during initial booting of computer systems.

2. Background of the Invention and Related Art

When a PC is powered up, generally a process called power-on self-test (POST), or a similar type booting process, is initiated. POST begins with an electrical signal being transmitted on a permanently programmed path to the microprocessor. This electrical signal results in the clearing of any left over data from the microprocessor's internal memory registers. Moreover, the signal also resets a microprocessor register containing the program counter to a specific number.

This number stored in the program counter tells the microprocessor the address of the next instruction that needs processing. For example, the address may be the beginning of a boot program stored permanently in a set of read-only memory (ROM) chips that contain the computer's basic input/output system (BIOS). The CPU, thus, can use the address from the program counter to find and invoke the BIOS boot program, which in turn invokes a series of system checks. The problem, however, arises in writing the code for this BIOS boot program.

In conventional computer systems, writing the code for the BIOS is difficult because of the lack of memory resources when the computer is being booted. Traditional memory, for example, cannot be used while the computer is being booted because it has not yet been initialized. Accordingly, the only available memory that BIOS coders could traditionally use is the general purpose registers actually contained inside the microprocessor. However, the number of these general purpose registers is generally limited. For example, typical Pentium® and Pentium®-type microprocessors only contain 8 general purpose registers. One skilled in the art, however, can readily recognize that the present invention can be adapted to virtually any type of modern microprocessor with virtually any number of general purpose registers.

With so few general purpose registers inside the microprocessor, however, writing the code for the BIOS becomes difficult. In particular, writing the code in a modular format, which normally requires a stack interface, becomes extremely difficult. In fact, conventional, prior-art BIOS code does not use the "call" and "return" functions normally used by modular code. Instead, conventional BIOS programming uses a jump interface. That is, the code contains instructions to jump to a particular routine and at the end of that routine to jump back to a particular place in the BIOS code.

As one skilled in the art can recognize, to properly utilize such a jump interface, the present address of the BIOS instruction being executed must be recorded prior to jumping to a new instruction in the BIOS code. This address of the currently executed BIOS instruction serves as the return address once the section of code jumped to has finished execution.

For the BIOS code to function properly, this return address must be stored in an incorruptible location. In the conventional computer system, for example, this return address is stored in one of the general purpose registers contained inside the microprocessor. However, because the BIOS program would become lost without this return address, it is important that the BIOS programmer not overwrite the general purpose register that contains the return address. Although not overwriting the return address is relatively simple for a single jump routine, the difficulty in not overwriting the return address becomes exponentially more difficult when nested routines or nested jumps are used. Because nested routines/jumps are generally needed throughout BIOS code, writing BIOS code using only the microprocessor's general purpose registers results in code that is excessively long and difficult to debug. Accordingly, a method and apparatus are needed to address the above-mentioned and other problems with conventional computer systems.

SUMMARY OF THE INVENTION

To remedy the deficiencies of existing systems and methods, the present invention provides a method and apparatus to provide additional data storage resources during booting procedures. For example, one embodiment of the present invention includes a mass storage device for storing computer programs; a microprocessor connected to the mass storage device, wherein the microprocessor includes an execution unit; a general purpose register for storing a first data element; an MMX unit including a plurality of MMX registers, which are configurable to act as a virtual stack in addition to their intended purpose. This embodiment further includes a storage device for storing BIOS instructions; and a plurality of BIOS instructions stored on the storage device, that cause the microprocessor to execute a virtual stack push instruction wherein the first data element is moved from the general purpose register to a first of the plurality of MMX registers; and to execute a virtual stack pop instruction wherein the first data element previously moved from the general purpose register to the first of the plurality of MMX registers is moved from the first of the plurality of MMX registers to the general purpose register; wherein the virtual stack push instruction and the virtual stack pop instruction are executable prior to initialization of a main memory.

BRIEF DESCRIPTION OF THE DRAWINGS

Various objects and advantages and a more complete understanding of the present invention are apparent and more readily appreciated by reference to the following Detailed Description of the Preferred Exemplary Embodiments of the Present Invention and to the appended claims when taken in conjunction with the accompanying Drawings wherein:

DETAILED DESCRIPTION

Figure 1:
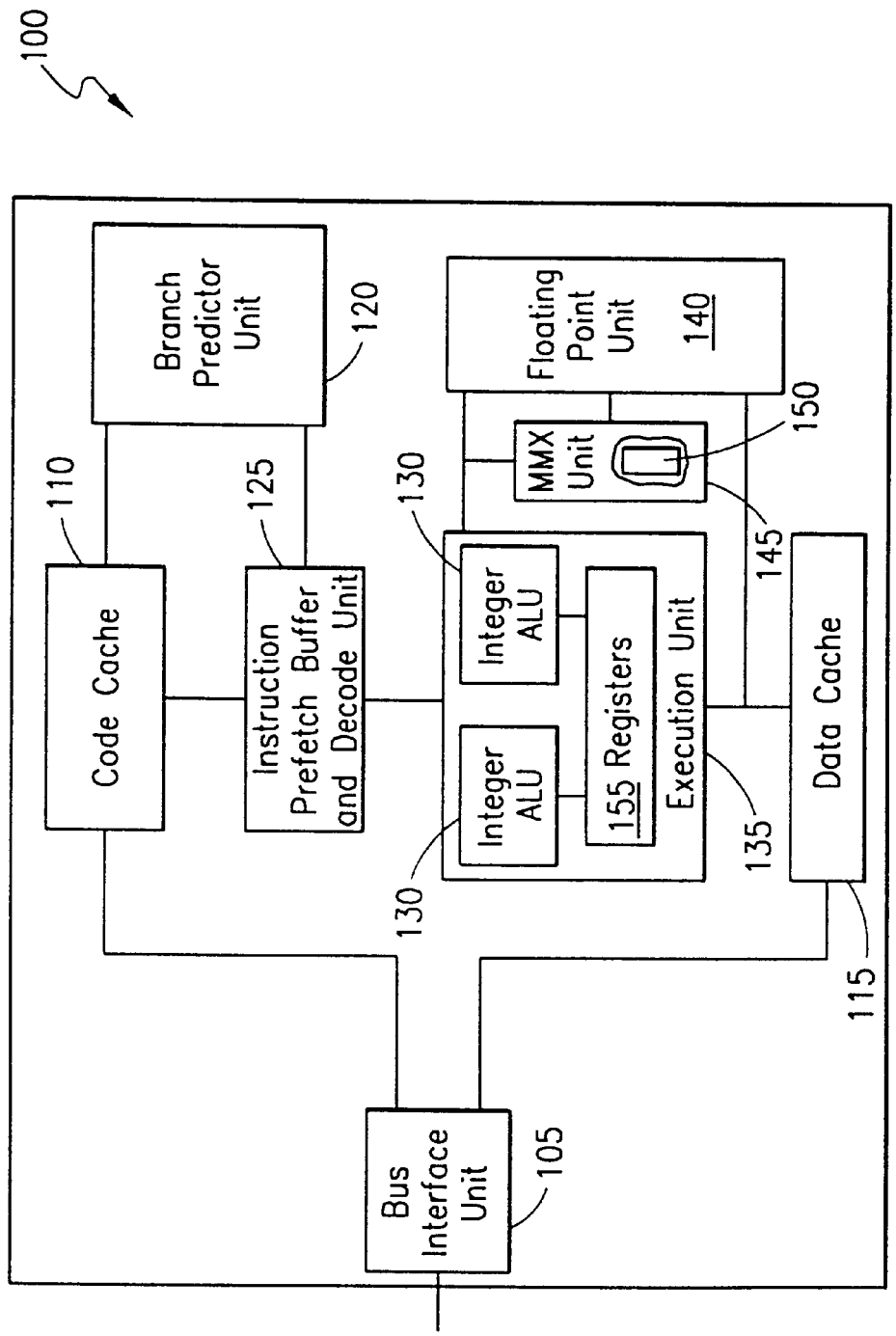
FIG. 1 illustrates a microprocessor including an MMX unit.

Although the present invention is open to various modifications and alternative constructions, a preferred exemplary embodiment that is shown in the drawings is described herein in detail. It is to be understood, however, that there is no intention to limit the invention to the particular forms disclosed. One skilled in the art can recognize that there are numerous modifications, equivalences and alternative constructions that fall within the spirit and scope of the invention as expressed in the claims.

Referring now to FIG. 1, there is illustrated a microprocessor 100 such as a Pentium® processor. (One skilled in the art, however, can recognize that the present invention is not limited to the specific microprocessor configured as shown in FIG. 1.) The microprocessor 100 includes a bus interface unit 105 connected to a code-cache 110 and a data-cache 115. Moreover, the microprocessor 100 includes a branch predictor unit 120 and an instruction prefetch buffer and decode unit 125 for passing instructions to the arithmetic decode logic units (ALUs) 130 contained inside the execution unit 135. If necessary, data with decimal fractions, such as 33.3, that need processing are passed to the floating point unit 140.

The microprocessor 100 also includes a MMX unit 145, which is a standard part of later Pentium®-type microprocessors and many other microprocessors. Conventionally, the MMX unit 145 is used for speeding up the processing of multi-media data for graphics, video and sound because graphics intensive applications have certain characteristics that lend themselves to specific types of processing. For example, many algorithms use multiple repetitive loops and operate on small data quantities. The MMX unit 145 has been designed to meet these processing requirements and to deliver higher multimedia performance. Thus, when the instructions passed to the microprocessor 100 request certain types of operations that involve graphics audio or video, those requests are routed to the MMX unit 145.

MMX technology uses a technique called Single Instruction, Multiple Data (SIMD) that speeds up software performance by using a single instruction to process multiple data elements in parallel (in contrast to the less efficient scheme in which a single instruction operates on a single piece of data). For example, graphics information represented in 8-bit blocks that once required eight repetitions of a single instruction is now executed with a single MMX technology instruction. The result, a performance increase for this operation of up to 8×.

To achieve this performance increase, MMX technology incorporates 57 new instructions (specifically designed to manipulate and process video, audio and graphical data more efficiently) and four new data types. These features deliver more calculations for each processor clock cycle and result in faster execution times and higher performance. In fact, the MMX unit technology enhances many types of software other than multimedia.

Although the MMX unit 145 is advantageous for performing small repetitious operations, an MMX unit such as MMX unit 145 generally is not used during POST. That is, the MMX unit 145 is not used during the early stages of boot-up. Because the MMX unit's 145 instruction set includes instructions for moving data between the individual MMX registers 150 and the general purpose registers 155, the MMX registers 150 can be used to streamline BIOS coding and overcome the difficulties with traditional BIOS coding. Moreover, one skilled in the art can recognize that other registers besides the MMX registers 150 can be used in a fashion similar to that described herein.

In one embodiment of the present invention, the MMX registers 150 contained inside the MMX unit 145 are used as simulated general purpose registers 155. Thus, instead of having just the eight general purpose registers 155 in the execution unit 135, the BIOS coder also could use the MMX registers 150 (for a total of 16 registers) to store data during booting procedures. However, the simulation of general purpose registers 155 by the MMX registers 150 still presents problems for the BIOS coder in that a jump interface rather than calls and returns must be used. That is, the BIOS coder must still store a return address in one of either the general purpose register 155 or the MMX registers 150, must remember at which register that return address was stored, and must not overwrite that register with other data.

In another embodiment of the present invention, however, the MMX registers 150 are used to create a virtual stack that allows BIOS coders to use simulated call and return (push/pop) routines that are associated with conventional modular coding. For example, special macros can simulate some, all, or any combination of a push, a pop, a call and return using a virtual stack created from the MMX registers 150. These macros are made possible by the fact that the microprocessor includes an instruction set that allows movement of data between the individual MMX registers 150 and the general purpose registers 155 in the execution unit 135.

For example, a "push" (a "virtual push") would transfer data from one of the general purpose registers 155 onto the top of the virtual stack. A "pop" (a "virtual pop"), on the other hand, would transfer data from the top of the virtual stack to one of the general purpose registers 155. Similarly, a "call" results in a "push" of the address of the currently executed instruction and a jump to the "called" routine. Moreover, a "return" results in a "pop" of a return address and a corresponding jump. Accordingly, BIOS programmers can use the virtual stack to code in a conventional modular fashion, thereby freeing up the general purpose registers 155 for more advanced coding practices. Moreover, by creating a virtual stack using the MMX registers 150, BIOS coders can code in a more efficient manner and debug in a more satisfactory fashion.

Figure 2:
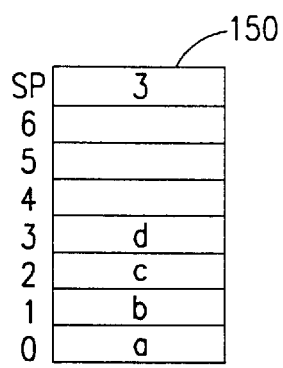
FIG. 2 illustrates the individual MMX registers of an MMX unit wherein one register is used as a stack pointer.

Referring now to FIG. 2, there are illustrated the MMX registers 150 of the MMX unit 145. These MMX registers 150 can be manipulated in a variety of ways to create a virtual stack. For example, FIG. 2 shows a virtual stack maintained with a traditional stack pointer (SP). The virtual stack includes the eight MMX registers 150 in the MMX unit 145. The MMX registers are numbered 0 through 6 and SP.

Still referring to FIG. 2, registers 0 through 3 include data (such as addresses) and register SP includes a pointer to the top of the virtual stack, which happens to be register 3. In this type of stack management system, a "pop" on the virtual stack would result in the data "d" being extracted from register 3 and the stack pointer being adjusted to reflect that the top of the virtual stack is now register 2. Thus, any manipulation of this type of virtual stack would require a read of register SP before any data could be "popped" or "pushed" to/from the virtual stack. Moreover, this type of stack management system results in the loss of one MMX register 150 for general use. That is, one register (register SP) ideally is used to store the stack pointer instead of traditional data.

Figure 3A:
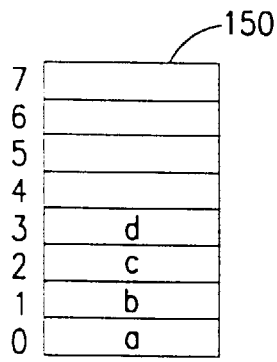
FIGS. 3A through 3C illustrate the individual registers of the MMX unit being subjected to manipulations according to the teaching of the present invention.
Figure 3B:
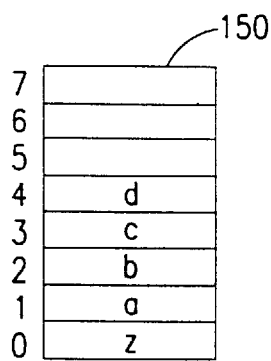
Figure 3C:
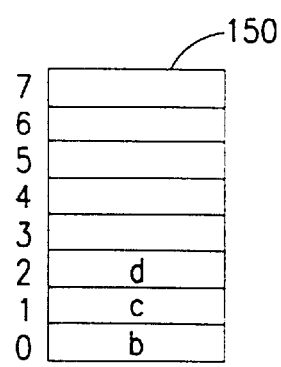

Accordingly, an alternate, preferred embodiment of the present invention maintains the virtual stack without using a stack pointer. Instead, the top of the virtual stack is always a particular register such as register 0. FIGS. 3A, 3B and 3C illustrate such a virtual stack. In each of these figures, the top of the virtual stack is always register 0—although it could be any other register. A "push" or "pop" to the virtual stack results in an operation at register 0. For example, a "push" of data "z" onto the stack as shown in FIG. 3A will result in the data arrangement as shown in FIG. 3b. First, each data item presently existing in the stack as shown in FIG. 3a is moved by one register. That is, data item "d" is moved from register 3 to register 4. Data item "c" is moved from register 2 to register 3. Data item "b" is moved from register 1 to register 2 and data item "a" is moved from register 0 to register 1. After all existing data items have been moved, the new data item "z" is inserted into register 0.

Similarly, a "pop" results in the data item in register 0 being removed and the other data items being moved one register. For example, FIG. 3C represents the virtual data stack after a "pop" function is performed on the data as originally stored in FIG. 3A. The "pop" results in data item "a" being removed and data items "b", "c", and "d" being moved one register such that data item "b" is at the top of the virtual stack.

Because the number of MMX registers 150 within the MMX unit 145 is still relatively small, it is often more efficient to merely shift the data as a result of a "push" or "pop" rather than to use a stack pointer. Similarly, because the number of MMX registers 150 is limited, it is often more efficient to execute a "move" instruction without testing to see if a register actually contains data. For example, a "push" of the data item "z" into the virtual stack as shown in FIG. 3a could result in a move instruction being executed for the data in register 6 to be moved to register 7 even though no data is actually contained in register 6. One skilled in the art, however, can readily recognize that error detection and other tests can easily be performed to avoid such moves and to avoid stack overflow.

Furthermore, in one embodiment of the present invention, the number of MMX registers 150 is increased by using both the lower 32 bits and the upper 32 bits of each of the 64 bit MMX registers 150. To efficiently use all 64 bits of the MMX registers 150, additional instructions can be added to the instruction set for the conventional MMX unit 145. For example, the instruction set can be expanded to include an instruction that allows movement of high order bits into low order bits (through, for example, shifting).

In summary, one embodiment of the present invention overcomes the deficiencies in the existing systems by taking advantage of the fact that the MMX registers 150 are not used during POST. Instead of using these MMX registers 150 for their intended purpose, the present invention manipulates the MMX registers 150 and uses them as storage space for a virtual stack. This virtual stack can be configured to transfer data between itself and the general purpose registers 155. In particular, data is "pushed" onto the virtual stack by moving the existing data in the MMX registers 150 to the next higher numbered register and then placing the data to be saved in the lowest register. Moreover, data is "popped" from the virtual stack by moving the data from the lowest number MMX register 150 into a general purpose register 155 and then moving the existing data in the MMX registers to the next lower numbered MMX register 150. Additionally, a "call" can be simulated by "pushing" the return address onto the virtual stack and passing control to the "called" subroutine. The return is simulated by "popping" the return address into a general purpose register 155 and then jumping to that address. This method provides for nested routine calls up to the data storage limit of the MMX registers 150.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A system for execution of code during power-on-self test (POST), the system comprising:
   a mass storage device for storing computer programs;
   a microprocessor connected to the mass storage device, the microprocessor comprising:
   an execution unit;
   a general purpose register connected to the execution unit, the general purpose register for storing a first data element;
   an MMX unit including a plurality of MMX registers, the MMX unit connected to the general purpose register, wherein the plurality of MMX registers are configurable as a virtual stack;
   an instruction storage device connected to the microprocessor, the storage device for storing BIOS instructions; and
   a plurality of BIOS instructions stored in the storage device, the plurality of BIOS instructions readable by the microprocessor to thereby cause the microprocessor to:
   execute a virtual stack push instruction wherein the first data element is moved from the general purpose register to a first of the plurality of MMX registers; and
   execute a virtual stack pop instruction wherein the first data element previously moved from the general purpose register to the first of the plurality of MMX registers is moved from the first of the plurality of MMX registers to the general purpose register;
   wherein the virtual stack push instruction and the virtual stack pop instruction are executable prior to initialization of a main memory.

2. The system of claim 1, wherein the mass storage device is a magnetic medium.

3. The system of claim 1, wherein the virtual stack push instruction and the virtual stack pop instruction are executable prior to initialization of random access memory (RAM).

4. The system of claim 1, wherein a second data element is stored in a second of the plurality of MMX registers and wherein the plurality of instructions stored on the instruction storage device are further configured to cause the microprocessor to:
   move the second data element from the second of the plurality of MMX registers to the first of the plurality of MMX registers responsive to execution of the virtual stack pop instruction.

5. The system of claim 1, wherein a second data element is stored in a second of the plurality of MMX registers and wherein the plurality of instructions stored on the instruction storage device are further configured to cause the microprocessor to:
   move the second data element from the second of the plurality of MMX registers to a third of the plurality of MMX registers responsive to execution of the virtual stack push instruction.

6. The system of claim 1, wherein a second of the plurality of MMX registers includes a stack pointer.

7. The system of claim 1, wherein the first data element is a program address associated with a program and wherein the plurality of instructions stored on the instruction storage device are further configured to cause the microprocessor to:
execute a virtual stack call instruction for passing control to a BIOS subroutine;
wherein the virtual stack call instruction initiates a virtual stack push instruction thereby moving the first data element from the general purpose register to the first of the plurality of MMX registers and thereby storing the program address.

8. The system of claim 7, wherein the plurality of instructions stored on the instruction storage device are further configured to cause the microprocessor to:
execute a virtual stack return instruction for returning control to the program at the program address;
wherein the virtual stack return instruction initiates a virtual pop instruction thereby moving the program address from the first of the plurality of MMX registers to the general purpose register; and
wherein the virtual stack return instruction initiates a jump to the program address.

9. A system for execution of code during boot-up procedures, the system comprising:
a microprocessor, the microprocessor comprising:
a general purpose register for storing a first data element; and
a plurality of secondary registers connected to the general purpose register, the plurality of secondary registers configured as a virtual stack;
a storage device connected to the microprocessor; and
a plurality of instructions stored on the storage device, the plurality of instructions readable by the microprocessor to thereby cause the microprocessor to:
execute a virtual stack push instruction wherein the first data element is moved from the general purpose register to a first of the plurality of secondary registers; and
execute a virtual stack pop instruction wherein the first data element previously moved from the general purpose register to the first of the plurality of secondary registers is moved from the first of the plurality of secondary registers to the general purpose register;
wherein the virtual stack push instruction and the virtual stack pop instruction are executable prior to initialization of a main memory.

10. The system of claim 9, wherein the plurality of secondary registers are included in an MMX unit.

11. The system of claim 10, wherein the microprocessor further comprises:
an execution unit wherein the general purpose register is included in the execution unit.

12. The system of claim 9, wherein the main memory is RAM.

13. The system of claim 9, wherein a second data element is stored in a second of the plurality of secondary registers and wherein the plurality of instructions stored on the storage device are further configured to cause the microprocessor to:
move the second data element from the second of the plurality of secondary registers to the first of the plurality of secondary registers responsive to execution of the virtual stack pop instruction.

14. The system of claim 9, wherein a second data element is stored in a second of the plurality of secondary registers and wherein the plurality of instructions stored on the storage device are further configured to cause the microprocessor to:
move the second data element from the second of the plurality of secondary registers to a third of the plurality of secondary registers responsive to execution of the virtual stack push instruction.

15. The system of claim 9, wherein a second of the plurality of secondary registers includes a stack pointer.

16. The system of claim 9, wherein the first data element is a program return address associated with a program and wherein the plurality of instructions stored on the storage device are further configured to cause the microprocessor to:
execute a call instruction for passing control to a subroutine;
wherein the call instruction initiates a virtual stack push instruction thereby moving the first data element from the general purpose register to the first of the plurality of secondary registers, thereby storing the program return address; and
wherein the call instruction passes control to the subroutine.

17. The system of claim 16, wherein the subroutine is a BIOS level subroutine.

18. The system of claim 16, wherein the plurality of instructions stored on the storage device are further configured to cause the microprocessor to:
execute a return instruction for returning control to the program at the program return address;
wherein the return instruction initiates a virtual pop instruction thereby moving the program return address from the first of the plurality of secondary registers to the general purpose register; and
wherein the return instruction transfers control to the program at the program return address.

19. A system for execution of BIOS code, the system comprising:
a microprocessor, the microprocessor comprising:
a general purpose register for storing a first data element; and
a plurality of secondary registers connected to the general purpose register, the plurality of secondary registers configured as a virtual stack;
a storage device connected to the microprocessor; and
a plurality of instructions stored on the storage device, the plurality of instructions readable by the microprocessor to thereby cause the microprocessor to:
execute a virtual stack push instruction wherein the first data element is moved from the general purpose register to a first of the plurality of secondary registers; and
execute a virtual stack pop instruction wherein the first data element previously moved from the general purpose register to the first of the plurality of secondary registers is moved from the first of the plurality of secondary registers to the general purpose register.

20. The system of claim 19, wherein the plurality of secondary registers are included in an MMX unit.

21. The system of claim 19, wherein the virtual stack push instruction and the virtual stack pop instruction are executable prior to initialization of a main memory device.

* * * * *